US006490923B1

United States Patent
Breng et al.

(10) Patent No.: US 6,490,923 B1
(45) Date of Patent: Dec. 10, 2002

(54) MICROMECHANICAL RPM SENSOR

(75) Inventors: Uwe Breng, Gundelfingen (DE); Martin Hafen, Rusteuhart (FR); Eberhard Handrich, Kirchzarten (DE); Bruno Ryrko, Denzlingen (DE)

(73) Assignee: LITEF GmbH (DE)

( * ) Notice: Subject to any disclaimer, the term of this patent is extended or adjusted under 35 U.S.C. 154(b) by 0 days.

(21) Appl. No.: 09/719,698

(22) PCT Filed: Apr. 8, 1999

(86) PCT No.: PCT/EP99/02389

§ 371 (c)(1),
(2), (4) Date: Dec. 14, 2000

(87) PCT Pub. No.: WO99/67597

PCT Pub. Date: Dec. 29, 1999

(30) Foreign Application Priority Data

Jun. 25, 1998 (DE) .......................... 198 28 424

(51) Int. Cl.$^7$ ............................................. G01C 19/00
(52) U.S. Cl. .................................................. 73/504.12
(58) Field of Search .......................... 73/504.12, 504.02

(56) References Cited

U.S. PATENT DOCUMENTS 5,959,206 A * 9/1999 Ryrko et al. ............. 73/504.12
6,119,517 A * 9/2000 Breng et al. ............. 73/504.12

FOREIGN PATENT DOCUMENTS

| DE | 19503623 | 8/1996 |
| DE | 19635923 | 2/1998 |
| WO | 9638710 | 12/1996 |

* cited by examiner

Primary Examiner—Richard A. Moller
(74) Attorney, Agent, or Firm—Elliott N. Kramsky

(57) ABSTRACT

A micromechanical rotation rate sensor based on the Coriolis principle includes two plate-like oscillators arranged one above the other in two planes for excitation to oscillate by means of an electrostatic drive. Three elements in each case form an oscillator structure. The oscillators are in each case suspended on opposite side edges by at least one web between an associated plate-like support and an associated drive plate element. The two supports and the two drive plate elements are, in each case, arranged one above the other in layers. A fixed plate element is located between the two drive plate elements so that, in each case, an identical narrow drive gap is defined between the drive plate elements. The drive gap is considerably smaller than the distance between the plate-like oscillators. An intermediate support that fills the intermediate space is inserted between the two plate-like supports and is completely electrically isolated from the surrounding frame to further reduce the respective capacitances to be recharged. The invention reduces the electrodynamic coupling between the drive and the read-out by a factor of about 100 in comparison with known micromechanical rotation rate sensors of like design.

10 Claims, 5 Drawing Sheets

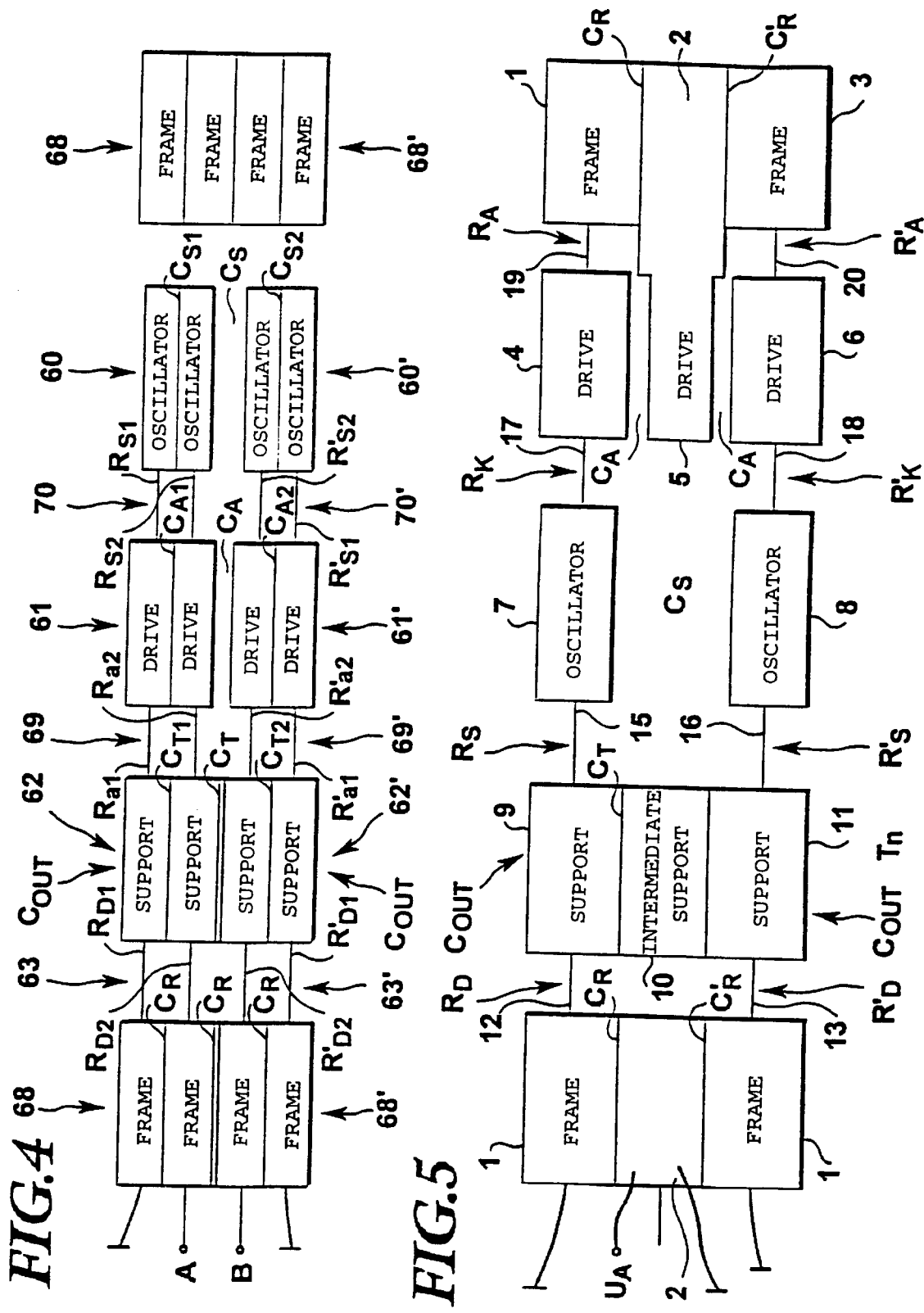

MICROMECHANICAL RPM SENSOR

BACKGROUND

1. Field of the Invention

The present invention relates to micromechanical rotation rate sensors based on the Coriolis principle. More particularly, the invention pertains to a sensor, including two oscillators, in the form of plates arranged one above the other in layers in parallel planes, which may be excited to oscillate at right angles to such planes by an electrostatic drive.

2. Description of the Prior Art

A micromechanical rotation rate sensor of the above-described type is described in detail in the International patent application published under Serial number WO 96/38710. FIG. 6 (which corresponds to FIG. 9 of the International patent application) illustrates such device. As stated earlier, such a rotation rate sensor comprises two oscillators which are arranged one above the other, aligned in layers. An upper oscillator 60, seen in the perspective view of FIG. 6, and a corresponding lower oscillator arrangement in mirror-image symmetry that cannot be seen in the figure are hinged via a first spring 70 on an electrostatic drive 61 in the form of a plate that is connected via a second spring 69 to a plate-like support 62. The entire arrangement, connected as a row and composed of the oscillator 60, the drive 61 and the support 62, is held in a frame 68 by a cross spring joint 63, 63'. As can be seen from FIG. 6, each element 60, 61, 62, including associated frame 68, has two layers, i.e., it is produced from a composite wafer with the interposition of a thin insulation layer (not shown) composed, for example, of $SiO_2$.

The upper two-layer frame 68 and the lower two-layer frame 68' thereby enclose an entire oscillator structure produced from four wafer layers, allowing different potentials to be supplied via outer frame connections 64 to 67. FIG. 6 does not illustrate cover and base wafers provided with bushings for electrostatic (capacitive) excitation, signal read-out and reset (in a closed-loop system); such features are illustrated at FIG. 2 of the above-referenced International publication which is hereby incorporated by reference.

The particular advantage of the two-layer oscillator structure as illustrated in FIG. 6 is that no interference with the measured values results from reaction forces caused by oscillator movement, although comparatively large oscillation amplitudes can be achieved with small capacitor drive gaps in the region of the drive 61. Rotation rate read-out is also capacitive via surface electrodes (not shown) on the upper face of the support 62 and on the lower face of the mirror-image support 62' (also not shown) with corresponding opposing electrodes on the cover or base wafer (not shown). The illustrated cross spring joint 63, 63' is advantageous in that rotary movements caused by Coriolis forces, and thus capacitance changes, are readily transmitted while, in contrast, horizontal and vertical oscillations in this area are suppressed.

In the oscillator of FIG. 6, electrostatic excitation is considerably simplified, despite relatively large oscillation amplitudes, by the narrow drive gap in the region of the drive 61, and can be produced with comparatively low drive voltages (e.g., a few volts). DC isolation of excitation and read-out can also be readily achieved by skillful use of silicon dioxide layers. For very low rotation rates, however, capacitive coupling combined with electrical resistances (which can only be undershot with difficulty due to design constraints) of the springs 63, 69, 70 can result in the injection of interference signals that are considerably larger than the signal to be measured. Thus, identification and isolation of the rotation rate signal places stringent demands on the electrical complexity.

SUMMARY AND OBJECTS OF THE INVENTION

It is therefore the object of the present invention to reduce electrodynamic coupling between the electrostatic drive and the rotation rate read-out or the rotation rate output.

The preceding and other objects are addressed by the present invention which provides a micromechanical rotation rate sensor based on the Coriolis principle. Such sensor includes two plate-like oscillators arranged one above the other in two planes for excitation via an electrostatic drive to oscillate at right angles to the planes.

The oscillators are suspended in the direction of a rotation axis on opposite side edges via, in each case, at least one narrow spring web between an associated plate-like support lying in the same plane, through which signals are read out, and an associated drive plate element of the electrostatic drive lying in the same plane.

The two supports and the two drive plate elements are, in each case, spaced apart, one above the other, with a fixed plate element inserted therebetween in such a manner that a narrow drive gap to the two drive plate elements is defined in each case. The drive gap is considerably smaller than the distance between the oscillators.

The preceding and additional features of the invention will become further apparent from the detailed description that follows. Such description is accompanied by a set of drawing figures. Numerals of the drawing figures, corresponding to those of the written description, point to the features of the invention with like numerals referring to like features throughout both the drawing figures and the written description.

BRIEF DESCRIPTION OF THE DRAWINGS

FIG. 4 illustrates the schematic series/parallel arrangement of a known oscillator structure (such as that illustrated in FIG. 6) in accordance with the equivalent circuit of FIG. 2;

FIG. 5 illustrates the series/parallel arrangement of the oscillator structure of FIG. 1 in accordance with the equivalent circuit of FIG. 3.

DETAILED DESCRIPTION OF THE PREFERRED EMBODIMENT

Figure 6:
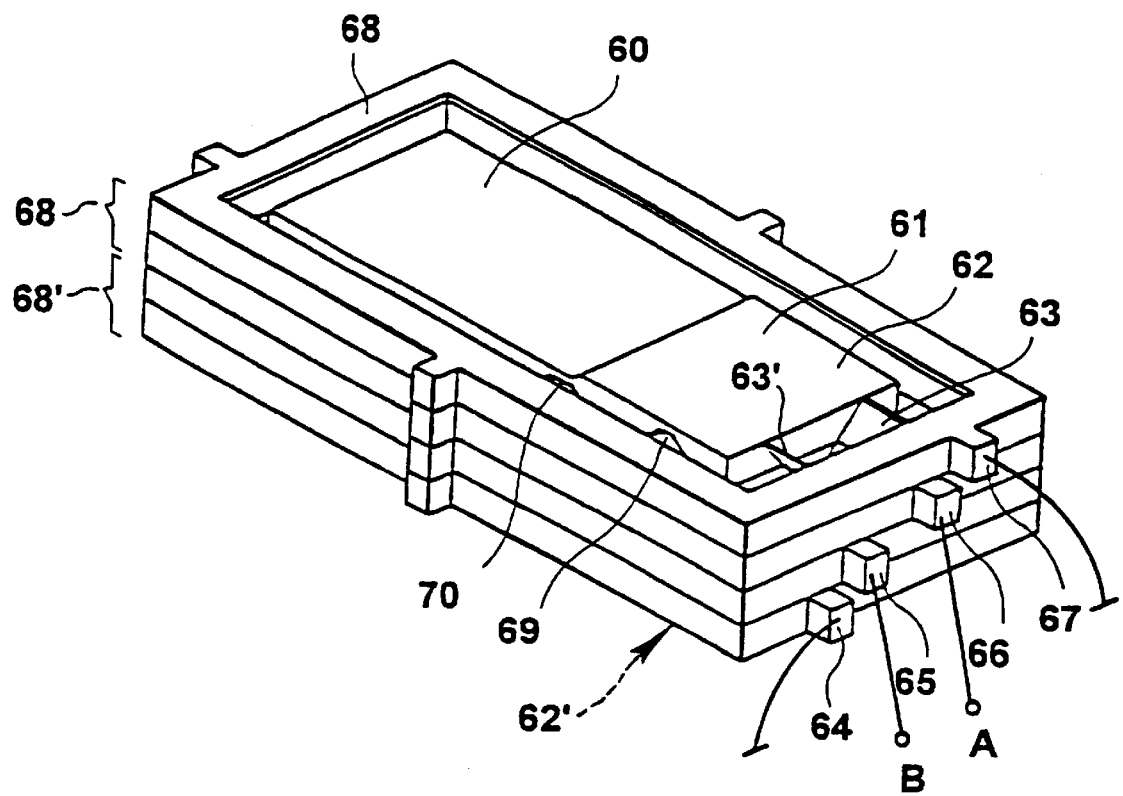
FIG. 6 is a perspective view of an oscillator structure for a micromechanical rotation rate sensor according to WO 96/38710.

The technical problem of reducing the electrodynamic coupling between the drive and the rotation rate read-out, the electrically coupled physical variables, namely the capacitances and resistances, are investigated first of all, with reference to the schematic illustration of FIG. 4, in which elements already described with reference to the prior art as shown in FIG. 6 employ identical reference numbers (e.g., the frames 68, 68, the cross spring joint 63, 63', the supports 62, 62', the (bending) springs 69, 69', the plate-like drive 61, 61', the (bending) spring joints 70, 70', and the oscillators 60, 60', which are hinged at one end.)

FIG. 4 shows the resistances to be taken into account, in particular, the resistances $R_{D1}$, $R_{D2}$, $R'_{D1}$, $R'_{D2}$ of the torsion springs and of the cross joint 63 between the upper frame 68 and the lower frame 68' to the respectively associated supports 62, 62', the resistances $R_{a1}$, $R_{a2}$, $R'_{a1}$, $R'_{a2}$ between the respective supports 62, 62' and the respective plate drive elements 61, 61', as well as the resistances $R_{S1}$, $R_{S1}$, $R'_{S1}$, $R'_{S2}$ between the respective plate drive elements 61, 61' and the associated oscillators 60, 60'. Also, in FIG. 4, the capacitances to be taken into account are illustrated, namely first the (roughly equal) capacitances CR between the individual layers of the frames 68, 68', the capacitances of $C_T$ and $C_{T1}$, $C_{T2}$ between the individual layers of the supports 62, 62', and the capacitances $C_A$ and $C_{A1}$, $C_{A2}$ between the layers of the drive plate elements 61, 61' and, finally, the capacitances $C_3$, and $C_{S1}$, $C_{S2}$ between the plate-like oscillators 60, 60' and the layer composite wafers that form them.

Figure 2:
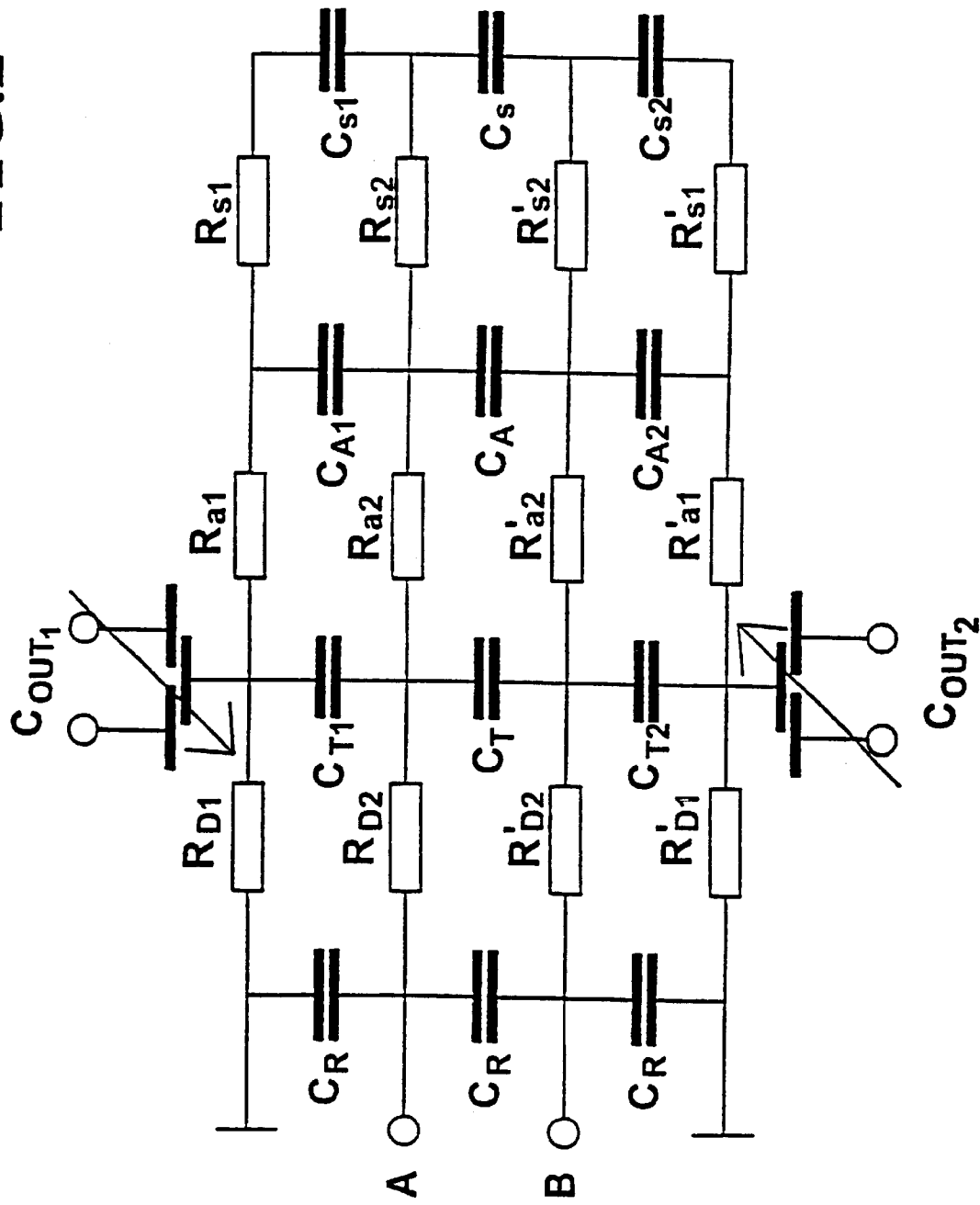
FIG. 2 is a diagram of the electrical equivalent circuit for a known micromechanical rotation rate sensor, such as that illustrated in FIG. 6.

The electrical equivalent circuit of FIG. 2 shows the networking of electrical variables, explained with reference to FIG. 4, of the prior art oscillator structure of FIG. 6. The read-out capacitances in the area of the two elements of the support 62 are represented by $C_{out1}$, and $C_{out2}$. As can be seen from FIG. 2, the charging currents for the capacitances $C_T$, $C_A$, $C_S$ or $C_{T1}$, $C_{A1}$, $C_{S1}$ and $C_{T2}$, $C_{A2}$, $C_{S2}$ flow across the resistances of the torsion springs, i.e., the cross spring joint 63, which resistances are denoted by $R_{D1}$ and $R_{D2}$. Corresponding voltage drops occur across the referenced capacitances. The difference signal for rotation rate is read out at the outputs from the rotation rate tap $C_{out1}$ and $C_{out2}$. The connected amplifiers (refer to FIG. 2 of WO 96/38710) admittedly have common-mode suppression.

Nevertheless, large interference signals result in considerable interference in the processing of small rotation rates with correspondingly small signal magnitudes restricting the dynamic range of the rotation rate sensor.

As a result of the design change in oscillator structure of a rotation rate sensor in accordance with the invention, explained below with reference to FIG. 1 and the schematic illustration of FIG. 5 as well as the corresponding equivalent circuit of FIG. 3, a considerable reduction in mutual electrodynamic coupling between the drive and the rotation rate read-out is achieved.

Figure 1:
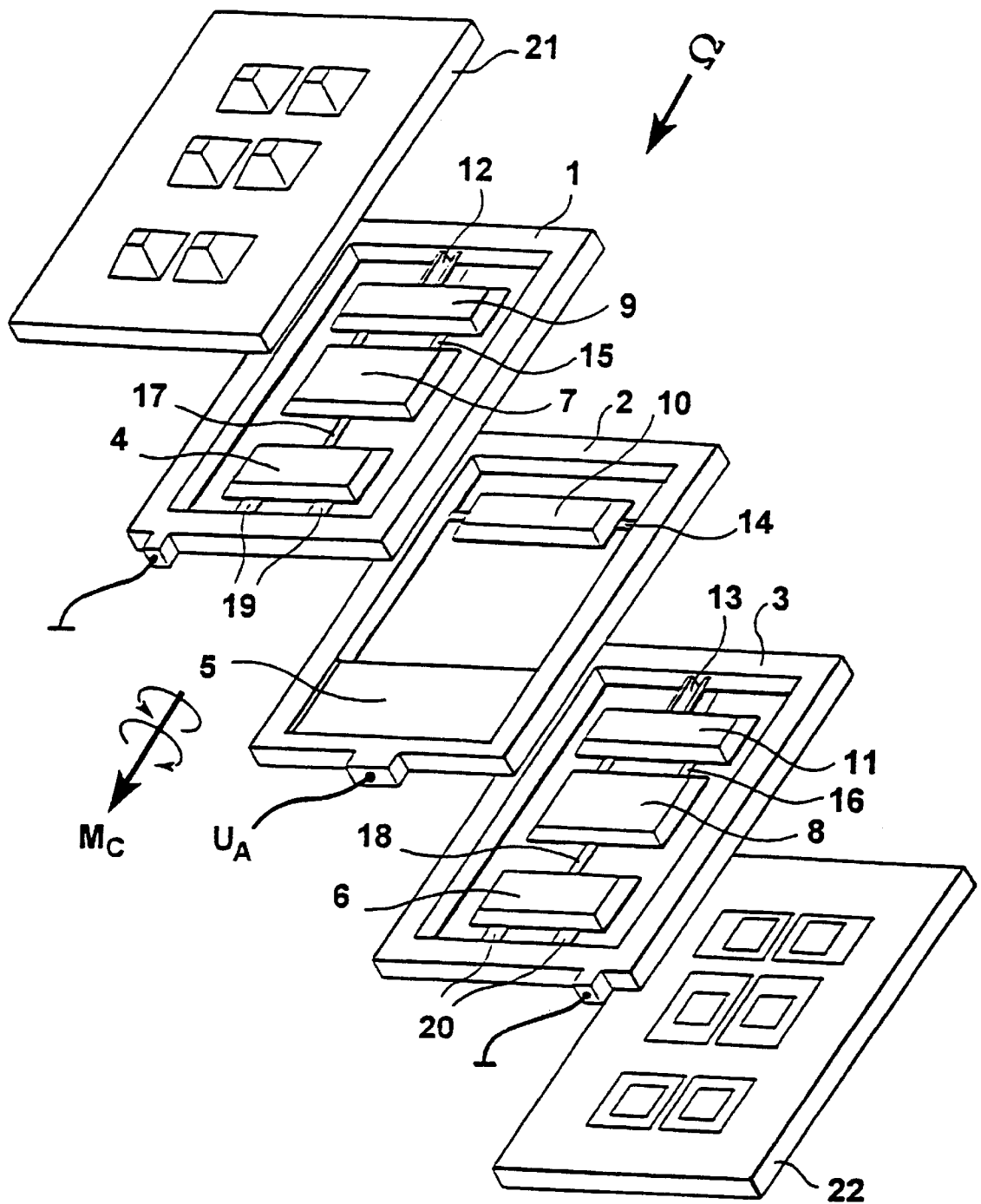
FIG. 1 is an exploded view of an oscillator structure for a micromechanical rotation rate sensor in accordance with the invention.

FIG. 1 illustrates a three-layer oscillator structure for a micromechanical rotation rate sensor according to the invention. The cover plate 21 and the base plate 22 will not be described in greater detail; rather, reference should be made to FIG. 2 of WO 96/38710 for details.

The individual layers of the three-layer oscillator structure form a three-part frame, 1, 2 and 3. Upper and lower plate drive elements 4 and 6 can be seen to be hinged via (torsion) springs 19 and 20 within the frames 1 of the wafer of the upper oscillator structure and 3 of the wafer of the lower oscillator structure respectively. A plate drive element 5 is located between the plate drive elements, bounded by narrow drive gaps and integrally connected to the central frame 2. The electrostatic drive is produced by the plate drive element 5 through application of a drive voltage $U_A$. The plate drive elements 4 and 6 are coupled via narrow spring webs 17 and 18 to plate-like oscillators 7 and 8, respectively.

The oscillators 7 and 8 are separated by relatively large distances, producing comparatively large oscillation amplitudes with small drive gaps. The plate-like oscillators 7 and 8 are connected, on the sides opposite the spring webs 17 and 18, by pairs of spring webs 15 and 16, respectively to, in each case, a plate-like element, referred to as a support 9 or 11, respectively, by means of which the rotation rate read-out is produced. The supports 9 and 11 are coupled to the frames 1 and 3 via torsion springs 12 and 13 respectively. In the illustrated example, the torsion springs 12 and 13 comprise cross spring joints. When the two oscillators 7 and 8 are excited to oscillate out-of-phase, Coriolis accelerations are produced by a rotation Ω about the respective torsion spring axes. Such oscillations produce an alternating moment M about the torsion spring axis.

According to one advantageous embodiment of the invention, which offers a considerable contribution to capacitance reduction, the upper support 9 and the lower support 11 are mechanically connected via an interposed support part 10 which initially (i.e., during manufacture and as illustrated) is connected to the surrounding frame 2 via webs 14 that are separated once the individual wafer layers have been bonded. This prevents the drive voltage $U_A$ from being coupled into the read-out circuits, $C_{out1}$ and $C_{out2}$, respectively.

An oscillator structure as illustrated in FIG. 1, thus, offers advantages that result from very small drive gaps and allows large oscillation amplitudes, while avoiding the previously-unavoidable large amount of coupling between the drive voltages and the read-out circuit. This results in only the central structure having an electrical excitation potential, applied via the frame 2, while the support structure comprising the upper support 9 and the lower support 11 with the interposed (auxiliary) support or intermediate support 10 (separated from the surrounding frame) is mechanically decoupled to a major extent with the wafer layers that contain the oscillators 7 and 8 at ground potential.

Figure 3:
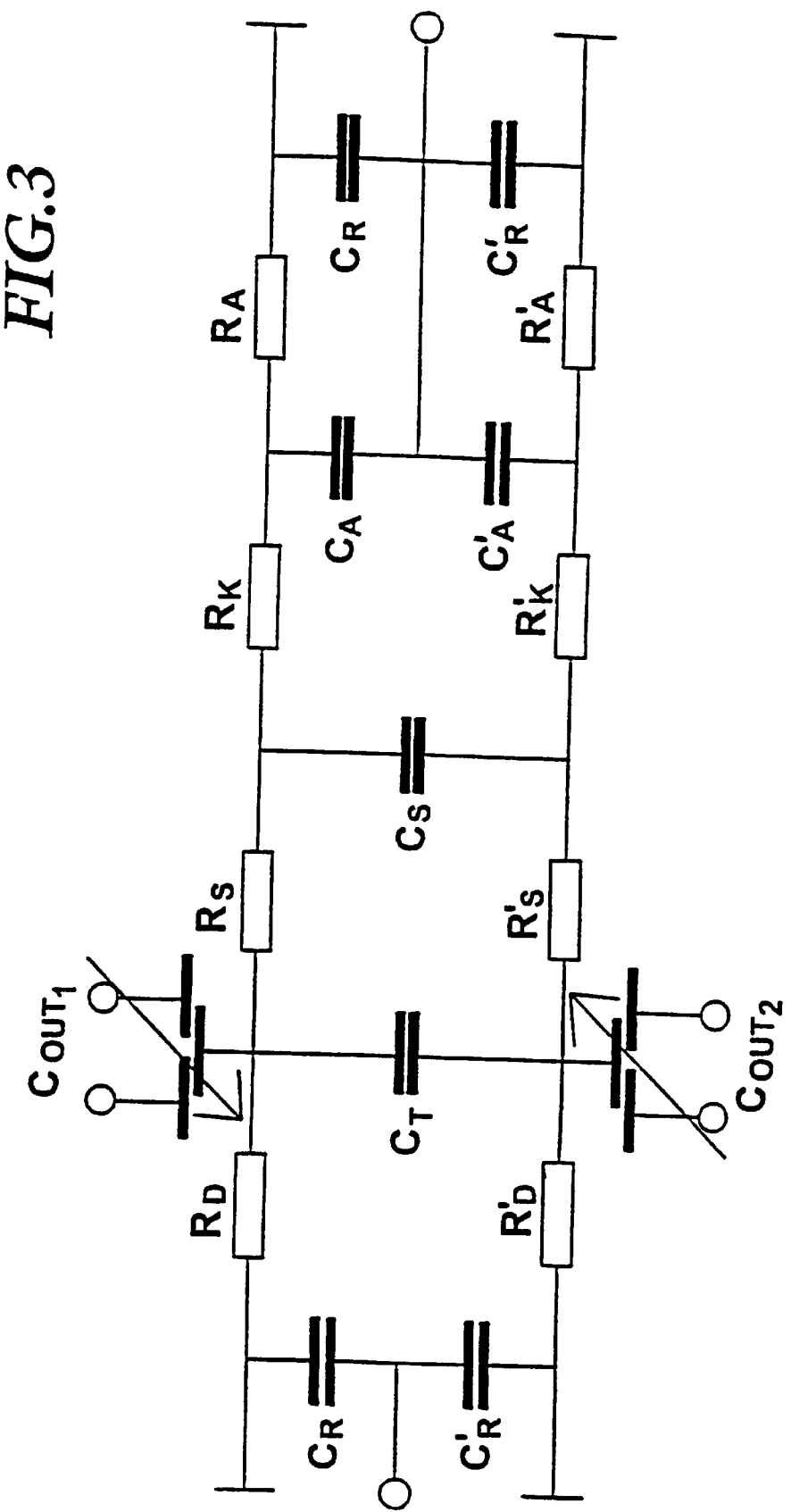
FIG. 3 is a diagram of the electrical equivalent circuit for a micromechanical rotation rate sensor in accordance with the invention.

This decoupling is evident if one considers the associated electrical equivalent circuit shown in FIG. 3. The primary result in this case is that the capacitances between the support 9 and the intermediate support 10, and between the support 11 and the intermediate support 10, can no longer be charged by the potential on the central wafer layer. Admittedly, the manufacturing process results in an insulation layer between the supports 9 and 10 and the supports 11 and 10, but this is irrelevant.

As can be seen from FIGS. 1 and 5, the supports 9, 10, 11 are aligned with their surfaces flush against one another, and the longitudinal dimension of the central drive plate element 5 (which is at the drive potential $U_A$) of the electrostatic drive extending within the frame 2 as far as the front edges of the drive plate elements 4, 6, respectively.

If one compares the electrical equivalent circuits shown in FIGS. 2 and 3, the invention as shown in FIG. 3 results in a considerable reduction in the capacitances acting between the live plates, i.e., in particular between the drive plate element 5 and the reference grounds, with respect to the read-out. While, in FIG. 2, the capacitors $C_{T1}$, $C_T$, $C_{T2}$, $C_{A1}$, $C_A$, $C_{A2}$, and the capacitors $C_{S1}$, $C_S$, $CS_2$ (i.e., those capacitors produced by the area of the support, of the drive and of the oscillator and by the thickness of the interposed $SiO_2$ layers and of the drive gap and oscillation gap) with charging taking place via the resistors $R_{D1}$, $R'_{D1}$ and $R_{D2}$, $R'_{D2}$, respectively, and the voltage drop produced across these resistors being coupled into the output circuit and being superimposed on the output voltage, in the invention (see FIG. 3) only the considerably smaller capacitors $C_S$ and $C_A$, $C'_A$ are still being charged via the resistances $R_A$, $R'_A$. Furthermore, only the smaller voltage drop across the resistance $R_A$, $R'_A$ acts, in the form of the voltage divider $$R_D/(R_D+R_S+R_K)$$

The interference voltage is thus considerably reduced by a factor on the order of magnitude of 100 as has been confirmed experimentally.

The critical factor for reducing the influence of the interference capacitances in the invention in comparison with the prior art is,
- the considerably reduced area of the parasitic capacitances resulting from the change to the excitation;
- the avoidance of any need to connect the central intermediate support 10 to the frame 2; and
- the change in the voltage division of the interference voltage resulting from the change to the arrangement of the drive oscillators and supports.

While this invention has been described with reference to its presently-preferred embodiment, it is not limited thereto. Rather, this invention is limited only insofar as it is defined by the following set of patent claims and includes within its scope all equivalents thereof.

What is claimed is:

1. A micromechanical rotation rate sensor based on the Coriolis principle comprising, in combination:
   a) two plate-like oscillators arranged one above the other in two planes for excitation via an electrostatic drive to oscillate at right angles to said planes;
   b) said oscillators being suspended in the direction of a rotation axis on opposite side edges via, in each case, at least one narrow spring web between an associated plate-like support lying in the same plane via which signals are read out, and an associated drive plate element of the electrostatic drive also lying in the same plane;
   c) said two supports and said two drive plate elements in each case being spaced apart, one above the other, with a fixed plate element inserted therebetween in such a manner that a narrow drive gap to the two drive plate elements is defined in each case; and
   d) said drive gap is considerably smaller than the distance between said oscillators.

2. A micromechanical rotation rate sensor as defined in claim 1, further including an intermediate support which fills an intermediate space, inserted between said two plate-like supports.

3. A micromechanical rotation rate sensor as defined in claim 1 or 2 wherein said pair of drive plate elements and said pair of plate-like supports each have identical surface areas.

4. A micromechanical rotation rate sensor as defined in claim 1 characterized in that:
   a) an oscillator with associated support and drive plate element is held within a surrounding frame by said spring webs; and
   b) an entire structure in each case is produced from a wafer.

5. A micromechanical rotation rate sensor as defined in claim 4, additionally comprising:
   a) a three-layer wafer layer composite;
   b) an upper and a lower layer structure in each case surrounded by an identical frame, a support, an oscillator, and a drive plate element;
   c) said fixed plate element being positioned between said to drive plate elements and connected to an identical frame; and
   d) an intermediate support fills said space between said supports but is not mechanically connected to said frame formed in said third interposed layer structure within said identical frame.

6. A micromechanical rotation rate sensor as defined in claim 5, further characterized in that:
   a) said intermediate support ends flush with said two supports in the direction of said two supports so that no overlapping area exists; and
   b) projecting oscillators lie one above the other.

7. A micromechanical rotation rate sensor as defined in claim 1, further characterized in that said supports are connected to associated frames via torsion springs.

8. A micromechanical rotation rate sensor as defined in claim 1 wherein said drive plate elements are connected to said associated frames by spiral springs.

9. A micromechanical rotation rate sensor as defined in claim 7 or 8 wherein said oscillators are in each case connected via spring webs to said associated support on one side and to said associated plate drive element on the other side.

10. A micromechanical rotation rate sensor as defined in claim 7 wherein said torsion springs comprise cross spring joints.

* * * * *